United States Patent
Kirkman

(10) Patent No.: US 8,217,778 B1
(45) Date of Patent: Jul. 10, 2012

(54) BRAKE LIGHT SWITCH FOR ENGINE BRAKE SYSTEMS

(76) Inventor: Robert Kirkman, Eagle River, AK (US)

( * ) Notice: Subject to any disclaimer, the term of this patent is extended or adjusted under 35 U.S.C. 154(b) by 445 days.

(21) Appl. No.: 12/589,910

(22) Filed: Oct. 30, 2009

(51) Int. Cl.
 *B60Q 1/44* (2006.01)
(52) U.S. Cl. ............ 340/479; 340/468; 307/10.8; 303/1
(58) Field of Classification Search .................... 340/479
 See application file for complete search history.

(56) References Cited

U.S. PATENT DOCUMENTS 5,426,418 A * 6/1995 Furgeson et al. ............. 340/479
6,137,401 A * 10/2000 Barrows ......................... 340/479

* cited by examiner

*Primary Examiner* — Donnie Crosland
(74) *Attorney, Agent, or Firm* — Michael J. Tavella

(57) ABSTRACT

Brake light circuits for use with engine brakes for both positive switch and negative switch brake light circuits. The brake light circuits for the engine brakes do not function until the engine brake solenoids are energized. This ensures that only true brake indications are indicated. In the case of the positive switch, the circuit uses a relay in parallel with the existing brake light switch to active the brake lights whenever the engine brake solenoids are energized. In the case of the negative switch circuit, the original brake pedal switch is connected to ground. It is used to operate a brake light relay that sends positive power to the brake lights. A second relay is used to close the ground connection to activate the original engine brake relay. In both cases, diodes are used to prevent back feed through the bake solenoids or other components.

14 Claims, 2 Drawing Sheets

BRAKE LIGHT SWITCH FOR ENGINE BRAKE SYSTEMS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to brake light switches for engine brakes and particularly to break light switches for engine brakes that utilize relays to operate the system.

2. Description of the Prior Art

Large trucks have an engine braking system to help stop the truck. The engine brakes are well known in the art. While effective, they have one flaw. Presently, there in no indication that a truck is using its engine brake to following vehicles. When standard brakes are employed, a switch engages a set of brake lights whenever the brake pedal is engaged. No such system is used when the engine brakes are used. Thus, following vehicles are often unaware that a large truck is braking, which creates a safety hazard.

Two patents that attempt to solve this problem are U.S. Pat. No. 5,426,418 and U.S. Pat. No. 6,137,401. In both of these patents, the brake lights are controlled by the engine brake switch. Thus, when the engine brake master switch is employed, the brake lights are energized. Note also, that both circuits are limited to positive switch circuits only. They will not work on the common negative switch circuits being used today. Finally, because they are both activated by the engine brake switch, they are not necessarily in sync with the actual braking. The engine brakes use up to three solenoids to actually initiate the braking. If the solenoids do not receive power, the brake lights will be illuminated anyway.

BRIEF DESCRIPTION OF THE INVENTION

The instant invention solves all of the above-cited problems. It provides circuits for both positive switch and negative switch circuits. Moreover, the circuits for the engine brake side do not function until the engine brake solenoids are energized. This ensures that only true brake indications are transmitted to following vehicles. In the case of the positive switch, the circuit uses a relay in parallel with the existing brake light switch to active the brake lights whenever the engine brake solenoids are energized. In the case of the negative switch circuit, the original brake pedal switch is connected to ground. It is used to operate a brake light relay that sends positive power to the brake lights. In the instant application, a second relay is used to close the ground connection to activate the original engine brake relay. In both cases, diodes are used to prevent back feed through the bake solenoids or other components.

DETAILED DESCRIPTION OF THE INVENTION

Figure 1:
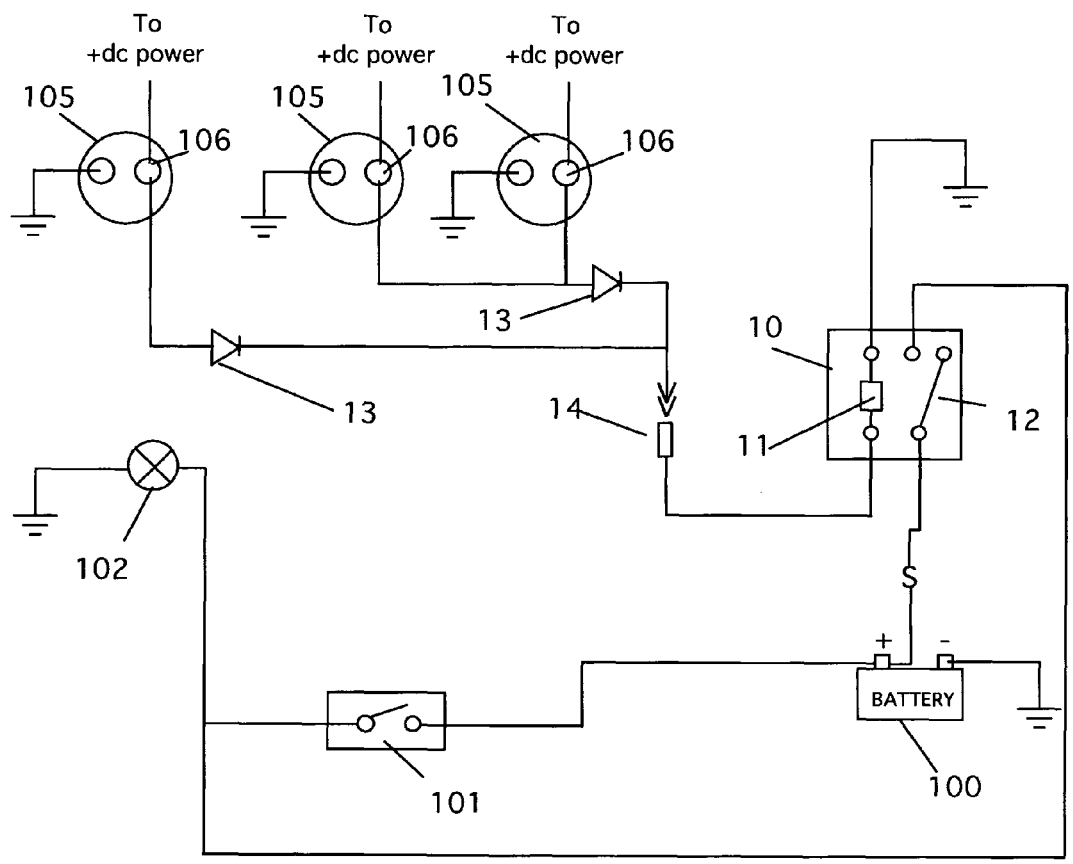
FIG. 1 is an electrical schematic diagram of a positive switch system showing the engine brake light system.

Referring now to FIG. 1, the basic positive switch system contains a power source 100, which is typical one of the vehicle batteries or main engine power source, a brake switch 101, which is typically attached to the brake pedal, and the set of brake lights 102. Under ordinary circumstances, when the driver engages the brakes by pressing on the foot pedal, switch 101 causes the brake lights 102 to illuminate. FIG. 1 shows the additional circuits used to illuminate the brake lights when the engine brakes are engaged.

FIG. 1 shows the circuit of the instant invention. It includes an engine brake operating system that includes three brake solenoids 105. These solenoids are used to activate the engine brakes. Typically, they are operated through switches (not shown) mounted in the truck cab. When the switches are thrown, positive power is sent to the solenoids positive terminals to engage the solenoids. In most cases, large trucks employ three solenoids that can be engaged in stages: from one to three solenoids in three steps. The addition of more solenoids increases the braking force applied. Unlike the prior art designs, which take power from the solenoid switches directly, the instant design takes positive power from each of the three solenoid terminals. This ensures that the brake lights are only illuminated when the braking is actually being applied.

To operate the system a relay 10 is used to control the operation of the lights when the engine brake is applied. The relay 10 has a coil 11 and a single throw contact 12 that is operated by the coil. Positive power is taken from the solenoid terminals 106 and is then routed through diodes 13 through a wiring harness and connectors 14. A wire I routed to one side of the coil 11 as shown (the other side of the coil goes to ground). When any of the engine brake solenoids receive positive power, the coil 11 becomes energized, which causes the contact 12 to trip. When that happens, positive power, which is connected to one side of the contact, as shown, is routed directly to the brake light system.

Figure 2:
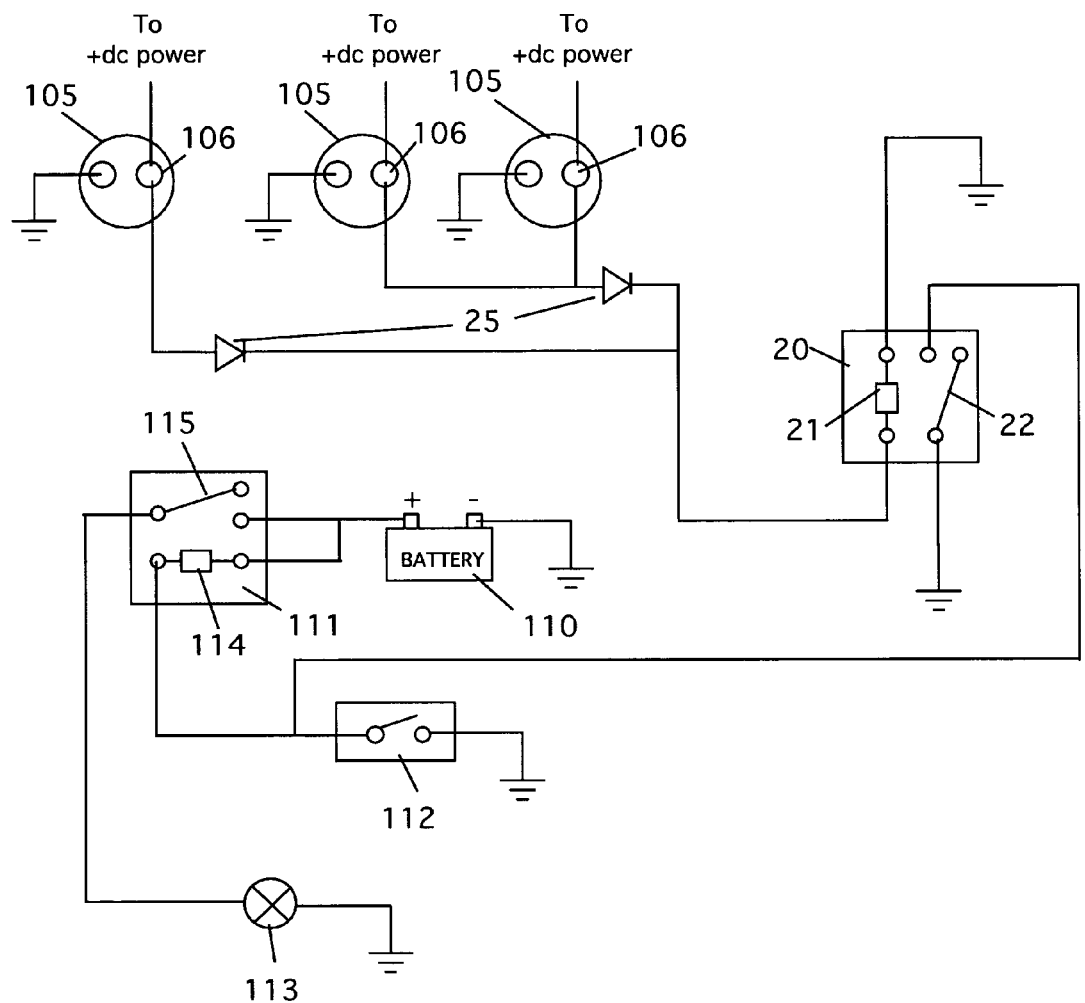
FIG. 2 is an electrical schematic diagram of a negative switch system showing the engine brake light system.

Many trucks also use a "negative switch" system to operate the brake lights. In this system, positive power is routed to the brake lights through a relay. FIG. 2 shows this circuit. The system consists of a power source 110, a relay 111, a brake pedal switch 112 and the brake lights 113. In this system, when the driver engages the brake pedal, a ground circuit is closed between the chassis ground and one side of the relay coil 114. Positive power is routed to the other side of the coil. Thus, when the brake pedal is depressed, the relay coil is energized and the single pole contact 115 trips, which puts positive power to the brake light system.

In the instant invention, this circuit is modified. FIG. 2 shows the solenoid coils 105 as before, a second relay 20 is used to control the brake lights. In this circuit, positive power is routed to the relay coil 21 from the positive terminals 106 of the solenoids, a gain using diodes 25 to prevent unwanted back flow of power. Thus, when the solenoids are energized, the relay coil 21 is energized and the relay contact 22 trips. In this case, the contact 22 places chassis ground on the open side of the coil in relay 111. In this way, the relay coil is energized and the relay contact 115 energizes the brake lights 113.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A brake light system for a truck having an engine brake, comprising:
   a) an engine brake operating system having a positive power terminal;
   b) a break pedal break light switch;
   c) a brake light array;
   d) a vehicular power source having a positive terminal;
   e) a first circuit connecting the vehicular power source positive terminal to the brake light array through the pedal brake light switch such that the brake light array is illuminated with power from the vehicular power source upon the pedal brake light switch being activated;
   f. a second circuit connecting the vehicular power source positive terminal and the brake light array including:
      i) a relay having a coil having two terminals, and a contact arm having a common terminal and an output terminal, and further wherein one of said two terminals on said coil is connected to chassis ground;
      ii) a connection between the positive power terminal on the engine brake operating system and the second of two terminals on said coil, such that when vehicular power is supplied to the positive terminal on the engine brake operating system, the coil is energized;
      iii) a connection from the positive terminal of the vehicular power source and the common terminal of the contact arm; and
      iv) a connection between the output terminal on said contact arm and the brake light array, such that when the coil is energized, positive power is applied to said brake light array.

2. The brake light system of claim 1 wherein said beak light array includes at least one brake light.

3. The brake light system of claim 1 wherein said beak light array includes a plurality of brake lights.

4. The brake light system of claim 1 wherein the engine brake operating system includes at least one solenoid having a positive terminal.

5. The brake light system of claim 4 wherein the second circuit further comprises a diode, placed between the positive terminal of the at least one solenoid and the second of two terminals on said relay coil.

6. The brake light system of claim 1 wherein the engine brake operating system includes three solenoids, each having a positive terminal.

7. The brake light system of claim 6 wherein the second circuit further comprises:
   a) a first diode, placed between the positive terminal of the one of said three solenoids and the second of two terminals on said relay coil; and
   b) a second diode placed between the positive terminals of the other two of said three solenoids and the second of two terminals on said relay coil.

8. A brake light system for a truck having an engine brake comprising:
   a) an engine brake operating system having a positive power terminal;
   b) a break pedal break light switch;
   c) a brake light array;
   d) a vehicular power source having a positive terminal;
   e) a first relay, said first relay including a coil having two terminals, and a contact arm having a common terminal and an output terminal; wherein the vehicular power source positive terminal is connected to one terminal of the coil of said first relay, and to the common terminal on the contact arm;
   f) A pedal brake light switch, having a first terminal connected to a chassis ground, and a second terminal connected to the second of two terminals on said coil of said first relay, such that when the pedal brake light switch is activated, the relay coil is energized and the brake light array is illuminated with power from the vehicular power source;
   g) a second relay also having a coil having two terminals, and a s contact arm having a common terminal and an output terminal, wherein one of said two terminals on said coil of said second relay is connected to chassis ground and further wherein the common terminal of said contact arm of said second relay is connected to chassis ground;
   h) a connection between the positive power terminal on the engine brake operating system and the second of two terminals on said coil of said second relay, such that when vehicular power is supplied to the positive terminal on the engine brake operating system, the coil of said second relay is energized;
   i) and further wherein when said coil of said second relay is energized, said contact arm of said second relay connects chassis ground to the second terminal of said coil of said first relay, such that the brake light array is illuminated with power from the vehicular power source.

9. The brake light system of claim 8 wherein said break light array includes at least one brake light.

10. The brake light system of claim 8 wherein said break light array includes a plurality of brake lights.

11. The brake light system of claim 8 wherein the engine brake operating system includes at least one solenoid having a positive terminal.

12. The brake light system of claim 11 further comprising a diode, placed between the positive terminal of the at least one solenoid and the second of two terminals on said relay coil of said second relay.

13. The brake light system of claim 8 wherein the engine brake operating system includes three solenoids, each having a positive terminal.

14. The brake light system of claim 13 further comprising:
   a) a first diode, placed between the positive terminal of the one of said three solenoids and the second of two terminals on said relay coil of said second relay; and
   b) a second diode placed between the positive terminals of the other two of said three solenoids and the second of two terminals on said relay coil of said second relay.

* * * * *